United States Patent [19]  [11] Patent Number: 5,030,247
Goldmann  [45] Date of Patent: Jul. 9, 1991

[54] MIXTURES OF DISAZO COMPOUNDS CONTAINING TWO PHENYL DIAZO COMPONENT RADICALS HAVING ONE OR TWO (C1-4 ALKOXY)CARBONYL GROUPS AND A BIS-ACETOACETAMIDO-ARYLENE COUPLING RADICAL

[75] Inventor: Jürgen Goldmann, Münchenstein, Switzerland

[73] Assignee: Sandoz Ltd., Basel, Switzerland

[21] Appl. No.: 434,141

[22] Filed: Nov. 9, 1989

Related U.S. Application Data

[63] Continuation of Ser. No. 36,740, Apr. 10, 1987, abandoned, which is a continuation of Ser. No. 891,724, Jul. 29, 1986, abandoned, which is a continuation of Ser. No. 693,594, Jan. 22, 1985, abandoned.

[30] Foreign Application Priority Data

Jan. 26, 1984 [DE] Fed. Rep. of Germany ...... 3402600

[51] Int. Cl.$^5$ .................... C09B 67/20; C09B 67/22; C09B 67/48; D06P 1/44
[52] U.S. Cl. ..................................... 8/639; 534/573; 534/745; 534/746; 534/748; 534/575
[58] Field of Search ............... 534/573 M, 745, 746, 534/748; 8/639

[56] References Cited

U.S. PATENT DOCUMENTS

| | | | |
|---|---|---|---|
| 3,361,736 | 1/1968 | Ribka | 534/748 X |
| 3,900,459 | 8/1975 | Kawamura et al. | 534/748 X |
| 3,997,521 | 12/1976 | Forter et al. | 534/748 X |
| 4,003,886 | 1/1977 | Muller | 534/748 X |

FOREIGN PATENT DOCUMENTS 1348714  3/1974  United Kingdom ............. 534/748

*Primary Examiner*—Floyd D. Higel
*Attorney, Agent, or Firm*—Gerald D. Sharkin; Richard E. Vila; Melvyn M. Kassenoff

[57] ABSTRACT

Mixtures of azo pigments of the formulae

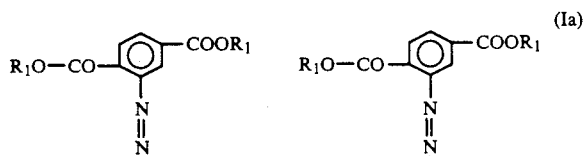

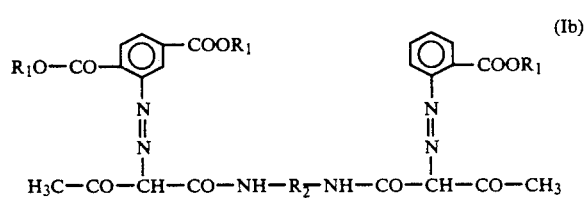

and

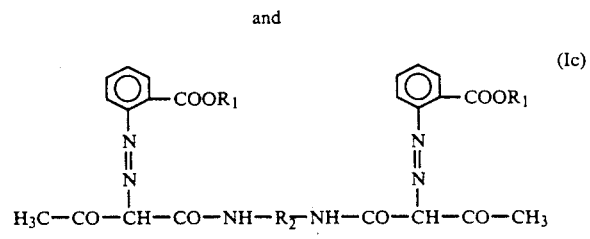

wherein
each $R_1$ is independently $C_{1-4}$alkyl, and
each $R_2$ is independently 1,4-phenylene; 1,4-phenylene substituted by 1 or 2 substituents independently selected from chloro, bromo, methyl, methoxy, trifluoromethyl (maximum of one) and nitro (maximum of one); 4,4'-diphenylene substituted by 1 or 2 substituents independently selected from chloro, bromo, methyl and methoxy, each substituent being in the 3- or 3'-position; 1,4-naphthylene or 1,5-naphthylene, the mixture containing from 8 to 20% mole of benzoic acid ester residues and from 92 to 80% mole of terephthalic acid ester residues, useful for pigmenting in the mass synthetic polymers, for example, polyethylene, polypropylene, polystyrene, polyvinyl chloride, synthetic leather and rubber latices.

3 Claims, No Drawings

MIXTURES OF DISAZO COMPOUNDS CONTAINING TWO PHENYL DIAZO COMPONENT RADICALS HAVING ONE OR TWO (C1-4 ALKOXY)CARBONYL GROUPS AND A BIS-ACETOACETAMIDO-ARYLENE COUPLING RADICAL

This is a continuation of application Ser. No. 07/036,740, filed Apr. 10, 1987 and now abandoned, which is a continuation of application Ser. No. 06/891,724, filed July 29, 1986 and now abandoned, which in turn is a continuation of application Ser. No. 06/693,594, filed Jan. 22, 1985 and now abandoned.

This invention relates to mixtures of azo pigments which are particularly useful for mass pigmenting polymeric materials.

According to the invention there are provided mixtures comprising azo pigments of the formulae

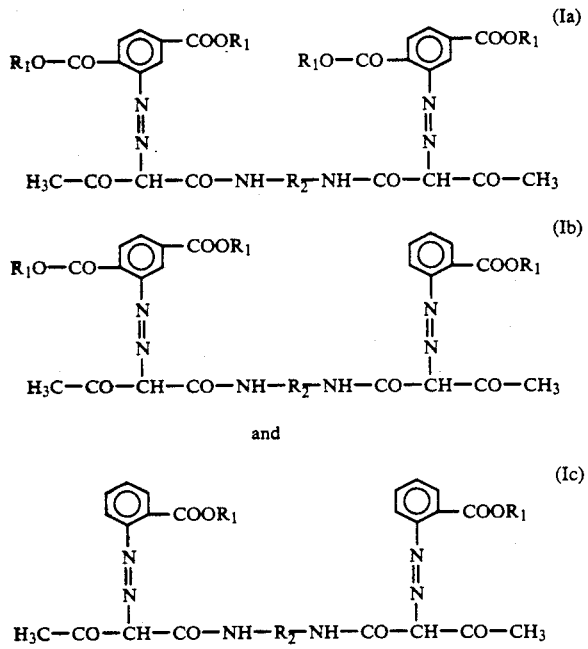

in which each $R_1$, independently, is $C_{1-4}$alkyl
each $R_2$, independently, is 1,4-phenylene, 1,4-phenylene substituted by up to two substituents independently selected from one or two chlorine, bromine methyl and methoxy, one trifluoromethyl and one nitro; 4,4'-diphenylene substituted in the 3 and/or 3' positions by up to two substituents independently selected from chlorine, bromine, methyl and methoxy; or 1,4- or 1,5-naphthylene
at least one compound of each of the three formulae being present, and
the mixture containing from 8 to 20 mole % of benzoic acid ester residues and from 92 to 80 mole % of terephthalic acid ester residues Any alkyl as $R_1$ may be linear or branched. Preferably $R_1$ is methyl or ethyl.

When $R_2$ is substituted 1,4-phenylene, it is preferably substituted by up to two substituents independently selected from chlorine, methyl and methoxy, more preferably by one such substituent.

When $R_2$ is substituted 4,4'-diphenylene, it is preferably a radical in which each phenyl ring bears a substituent. Preferred substituents are chlorine, methyl and methoxy. More preferably, the 4,4'-diphenylene group as $R_2$ bears two identical substituents located in the positions 3 and 3'.

$R_2$ is preferably $R_2'$, where $R_2'$ is unsubstituted 1,4-phenylene; 1,4-phenylene substituted by up to two substituents selected from chlorine, methyl and methoxy; 3,3'-dichloro-4,4'-diphenylene; 3,3'-dimethyl-4,4'-diphenylene, 3 3'-dimethoxy-4,4'-diphenylene; and unsubstituted 1,5-naphthylene. More preferably $R_2$ is $R_2''$, where $R_2''$ is 1,4-phenylene.

In the mixture of the invention, the groups $R_1$ and the groups $R_2$, respectively, may be identical or different. Preferably all groups $R_1$ are identical and all groups $R_2$ are identical.

Preferably the minimum amount of each component is 50 mole % for the component of formula Ia, 5 mole % for the component of formula Ib and 0.3 mole % for the component of formula Ic.

Preferably the mixture of the invention contains from 8 to 12 mole % benzoic acid ester residues and from 92 to 88 mole % terephthalic acid ester residues Preferred mixtures of the invention are those containing compounds of formulae Ia, Ib and Ic in which the $R_1$'s are either methyl or ethyl and the $R_2$'s have one of the significances given above for $R_2'$, the % mole ratios of the benzoic acid ester residues and of the terephthalic acid ester residues being as already indicated.

More preferred mixtures of the invention are those containing compounds of formulae Ia, Ib and Ic in which the $R_1$'s are either methyl or ethyl and the $R_2$'s are $R_2''$, said mixtures containing from 8 to 12 mole % benzoic acid ester residues and from 92 to 88 mole % terephthalic acid ester residues The mixtures of the invention may be prepared according to known methods, e.g. by mixing the components at such a ratio that the final mixture contains the indicated mole % benzoic and terephthalic acid ester residues.

Preferably the mixtures are prepared by coupling a mixture of the diazo derivatives of an amine of formula IIa

and of an amine of formula IIb

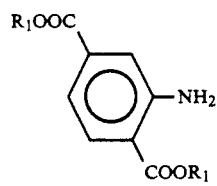

in which each $R_1$, independently, is as defined above, with a compound of formula III

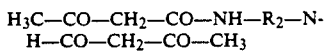

in which $R_2$ is as defined above or a mixture thereof in a mole ratio IIa:IIb:III of from 0.8-2:8-9 2:5. Preferred mixtures of the invention are those obtainable according to this method of preparation Diazotization and coupling may be carried out according to known methods.

The compounds of formulae IIa, IIb and III are known

Before use, the mixture of the invention can be after-treated according to known methods, e.g. treated in an organic solvent having a high boiling point such as dimethylformamide or 1,2-dichlorobenzene.

The mixtures of the invention is useful for pigmenting in the mass synthetic polymers such as polyethylene, polypropylene, polystyrene, polyvinyl chloride, synthetic leather and rubber latices, in the presence or absence of solvents The resulting pigmentations have good all-round fastness properties, more particularly good light fastness The mixture of the invention have a high tinctorial depth. In addition to these properties, the mixtures of the invention is characterized by a high dispersibility. Owing to this dispersion ability in polymeric materials, the mixtures are particularly useful for spin dyeing in the mass of synthetic polymers, preferably polypropylene. Of particular interest is that the resulting mass-pigmented shaped articles, particularly polypropylene fibres, have improved tensile strength.

The mass pigmenting of polymeric materials with the mixtures of the invention, particularly spin dyeing may be carried out according to known methods. Spin dyeing in the mass is preferably effected using the masterbatch procedure. In the following Examples which illustrate the invention. the parts and percentages are by weight so far as not otherwise indicated and the temperatures in degrees Centigrade.

EXAMPLE 1

(a) 76.0 Parts 2-aminoterephthalic acid dimethyl ester and 6.1 parts anthranilic acid methyl ester are stirred with 100 parts water and 100 parts (by volume) concentrated hydrochloric acid for 4 hours. After cooling to 0° by the addition of 125 parts ice and using a water/ice cooling bath, 105 parts (by volume) of a 4N sodium nitrite solution are added to the mixture and the whole is further stirred for one hour at 0°-5°. Thereafter the excess nitrous acid is destroyed with a small amount of aminosulphonic acid. The mixture is then filtered to remove the small-amounts of impurities which are present.

(b) 55.2 Parts 1,4-bis-(acetoacetylamino)-benzene are dissolved at approx. 50° in 400 parts water and 60 parts (by volume) 30% sodium hydroxide and the resulting mixture is then filtered.

(c) The diazo solution obtained in a) is diluted with 1000 parts water and 600 parts ice and adjusted to pH 4.0 with a sodium acetate solution. To this solution there is added the solution obtained in (b), over the course of approx. 30 minutes. The resulting lemon yellow suspension is further stirred for 2 hours at 5°-10°, one hour at 40°-45° and one hour at 80°-85°. The mixture is then filtered and the filtration cake is washed salt free with water, dried and ground. It contains 90 mole % dimethyl terephthalate and 10 mole % methyl benzoate residues The resulting pigment mixture gives yellow pigmentations with good fastness properties When replacing in the above procedure the 1,4-bis-(acetoacetylamino)-benzene by an equivalent amount of a corresponding derivative substituted in the benzene nucleus either by methyl, methoxy or chlorine, pigments are obtained which give reddish, orange or yellow-greenish pigmentations, respectively

EXAMPLE 2

A pigment concentrate is formed in an extruder with 70 parts commercially available low molecular weight polyethylene and 30 parts of the pigment mixture obtained in c) above. This concentrate is then added at a ratio of 1:50 to commercially available polypropylene and the resulting pigmented mass is spun according to known methods The resulting fibres have good tensile strength.

The pigment concentrate can also be added at a ratio of 1:50 to polyethylene and the resulting pigmented mass is then formed into blown films which have good tensile strength.

What is claimed is:

1. A mixture of (a) at least one compound of the formula

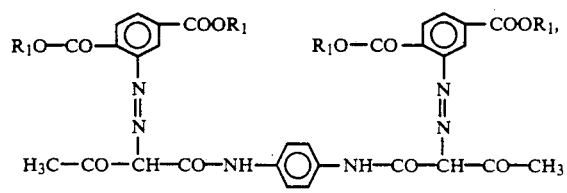

(b) at least one compound of the formula

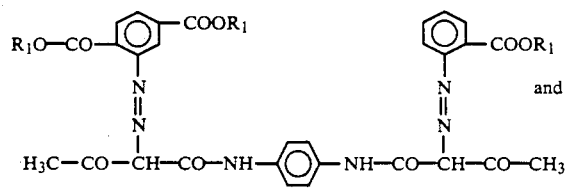

(c) at least one compound of the formula

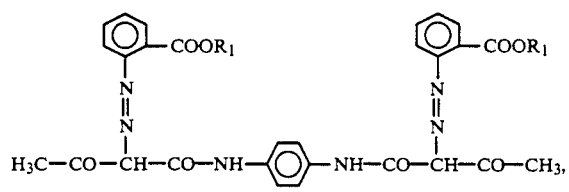

wherein each $R_1$ is independently methyl or ethyl, with the proviso that the mixture contains 8 to 12 mole per cent groups of the formula

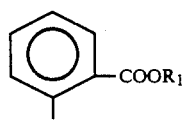

and 88 to 92 mole per cent groups of the formula

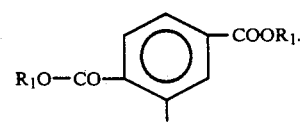

2. A mixture according to claim 1 wherein each $R_1$ is methyl or each $R_1$ is ethyl.

3. A mixture according to claim 2 wherein each $R_1$ is methyl.

* * * * *